US009841056B2

(12) United States Patent
Snow et al.

(10) Patent No.: US 9,841,056 B2
(45) Date of Patent: Dec. 12, 2017

(54) BEARING WITH DRAINED RACE AND SQUEEZE FILM DAMPER

(71) Applicant: General Electric Company, Schenectady, NY (US)

(72) Inventors: Kyle Robert Snow, Loveland, OH (US); Philip J. Ogston, Blue Ash, OH (US); Christopher Michael Grady, West Chester, OH (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 14/919,453

(22) Filed: Oct. 21, 2015

(65) Prior Publication Data

US 2017/0114831 A1  Apr. 27, 2017

(51) Int. Cl.

| | |
|---|---|
| *F16C 33/66* | (2006.01) |
| *F01D 25/16* | (2006.01) |
| *F01D 25/18* | (2006.01) |
| *F16C 19/16* | (2006.01) |
| *F16C 35/04* | (2006.01) |
| *F16C 27/04* | (2006.01) |
| *F16C 19/06* | (2006.01) |

(52) U.S. Cl.
CPC ........ *F16C 33/6685* (2013.01); *F01D 25/162* (2013.01); *F01D 25/18* (2013.01); *F16C 19/16* (2013.01); *F16C 27/045* (2013.01); *F16C 33/6659* (2013.01); *F16C 35/045* (2013.01); *F05D 2220/32* (2013.01); *F05D 2240/54* (2013.01); *F05D 2260/96* (2013.01); *F16C 19/06* (2013.01); *F16C 33/6677* (2013.01); *F16C 2360/23* (2013.01)

(58) Field of Classification Search
CPC ...................................................... F16C 27/045
See application file for complete search history.

(56) References Cited

U.S. PATENT DOCUMENTS

| | | | | |
|---|---|---|---|---|
| 3,844,630 | A | * | 10/1974 | Lechner ................ F16C 27/045 384/99 |
| 4,547,083 | A | * | 10/1985 | Horler ................... F01D 25/164 384/535 |
| 4,652,219 | A | * | 3/1987 | McEachern, Jr. ....... F01D 25/16 384/518 |
| 5,106,209 | A | | 4/1992 | Atkinson et al. |
| 5,201,585 | A | | 4/1993 | Gans et al. |
| 5,228,784 | A | | 7/1993 | Bobo |
| 5,253,985 | A | * | 10/1993 | Ruetz .................... F01D 25/164 384/473 |
| 5,316,391 | A | | 5/1994 | Monzel |
| 5,344,239 | A | | 9/1994 | Stallone et al. |
| 5,749,660 | A | | 5/1998 | Dusserre-Telmon et al. |
| 6,325,546 | B1 | | 12/2001 | Storace |
| 6,893,208 | B2 | | 5/2005 | Frosini et al. |

(Continued)

*Primary Examiner* — Thomas R. Hannon
(74) *Attorney, Agent, or Firm* — General Electric Company; William Scott Andes

(57) ABSTRACT

A bearing apparatus includes: a bearing including a first race rotatable relative to a second race, wherein the first race includes one or more drain passages extending therethrough; and a squeeze film damper connected to the first race, the squeeze film damper including first and second squeeze film spaces separated by an oil drain path which communicates with the one or more drain passages of the first race.

11 Claims, 3 Drawing Sheets

(56) References Cited

U.S. PATENT DOCUMENTS

| | | | |
|---|---|---|---|
| 7,040,811 B2 | 5/2006 | Dusserre-Telmon et al. | |
| 7,517,152 B1* | 4/2009 | Walsh | F16C 23/08 |
| | | | 384/99 |
| 8,956,048 B2* | 2/2015 | Schmidt | F16C 27/045 |
| | | | 384/99 |
| 2003/0059142 A1 | 3/2003 | Shirokoshi et al. | |
| 2013/0336608 A1 | 12/2013 | Miller et al. | |
| 2014/0086731 A1* | 3/2014 | Schmidt | F01D 25/125 |
| | | | 415/170.1 |

* cited by examiner

BEARING WITH DRAINED RACE AND SQUEEZE FILM DAMPER

STATEMENT REGARDING FEDERALLY SPONSORED RESEARCH AND DEVELOPMENT

The U.S. Government may have certain rights in this invention pursuant to contract no. FA8650-09-D-2922 awarded by the Department of the Air Force.

BACKGROUND OF THE INVENTION

This invention relates generally to rolling element bearings and more particularly to the mounting of such bearings in gas turbine engines.

A gas turbine engine includes one or more shafts which are mounted for rotation in several bearings, usually of the rolling-element type. The bearings are enclosed in enclosures called "sumps" which are pressurized and provided with an oil flow for lubrication and cooling. The bearings in a gas turbine engine are usually a combination of roller and ball bearings. The roller bearings react radial loads of the shafts and the ball bearings react radial and thrust loads.

In operation, the shafts are subject to vibration and dynamic loads caused by rotor and shaft unbalance and by self-excited whirl (i.e. dynamic instability). It is known in the turbomachinery field to use squeeze film bearing dampers to reduce the adverse vibrations due to high-speed rotor dynamics. Typically, the outer race of a rolling-element bearing is fitted with a small radial clearance. The clearance is filled with oil, and hydrodynamic forces are generated by the motion of the bearing under the influence of unbalance or other excitation. The squeeze film acts as a nonlinear spring and damper system which can significantly reduce the dynamic loads and suppress dynamic instability. Typically, a squeeze film damper would be provided with piston rings to limit the leakage of oil from the clearance.

It is further known to provide the outer race of a rolling-element bearing with drain holes through which lubricating oil can escape. Such "drained outer race bearings" are known to reduce bearing heat generation. Combining a drained outer race with a typical dual piston ring squeeze film damper would be problematic because the circumferential oil film would interfere with the bearing oil drain holes.

Accordingly, there remains a need for a bearing incorporating the functions of both a drained outer race and a squeeze film damper.

BRIEF DESCRIPTION OF THE INVENTION

This need is addressed by a rolling element bearing incorporating a drained outer race and a squeeze film damper.

BRIEF DESCRIPTION OF THE DRAWINGS

The invention may be best understood by reference to the following description, taken in conjunction with the accompanying drawing figures in which.

DETAILED DESCRIPTION OF THE INVENTION

Figure 1:
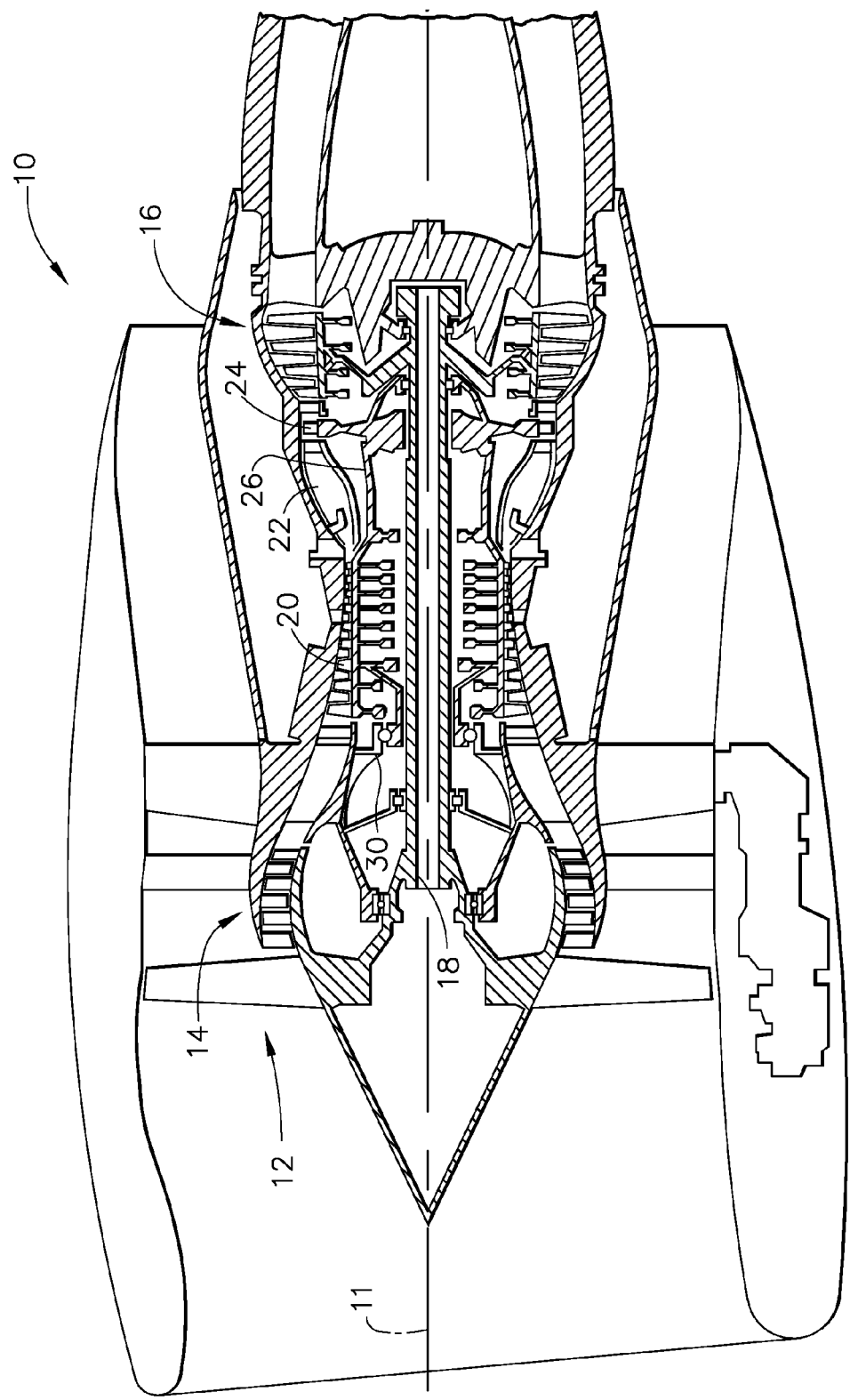
FIG. 1 is a schematic cross-sectional view of a gas turbine engine.

Referring to the drawings wherein identical reference numerals denote the same elements throughout the various views, FIG. 1 depicts a gas turbine engine 10. The engine 10 has a longitudinal axis 11 and includes a fan 12, a low pressure compressor or "booster" 14 and a low pressure turbine ("LPT") 16 collectively referred to as a "low pressure system".

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and tangential directions. As used herein, the terms "forward" or "front" refer to a location relatively upstream or forward in the engine 10, and the terms "aft" or "rear" refer to a location relatively downstream or rearward in the engine 10. These directional terms are used merely for convenience in description and do not require a particular orientation of the structures described thereby.

The LPT 16 drives the fan 12 and booster 14 through an inner shaft 18, also referred to as an "LP shaft". The engine 10 also includes a high pressure compressor ("HPC") 20, a combustor 22, and a high pressure turbine ("HPT") 24, collectively referred to as a "gas generator" or "core". The HPT 24 drives the HPC 20 through an outer shaft 26, also referred to as an "HP shaft". Together, the high and low pressure systems are operable in a known manner to generate a primary or core flow as well as a fan flow or bypass flow. While the illustrated engine 10 is a high-bypass turbofan engine, the principles described herein are equally applicable to turboprop, turbojet, and turboshaft engines, as well as turbine engines used for other vehicles or in stationary applications.

Figure 2:
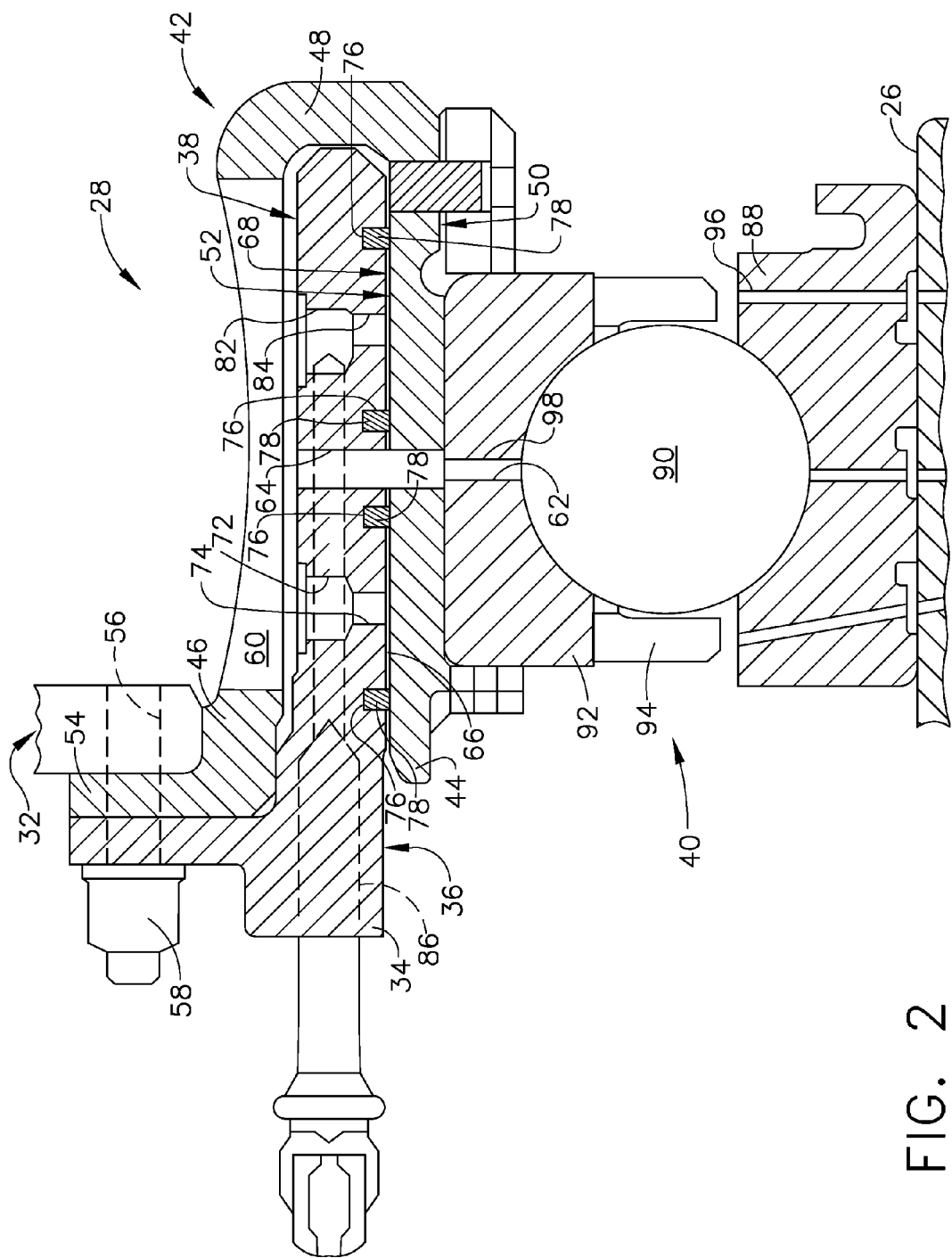
FIG. 2 is a schematic cross-sectional view of a bearing apparatus for use with the engine of FIG. 1.

The inner and outer shafts 18 and 26 are mounted for rotation in several rolling-element bearings. The bearings are located in enclosed portions of the engine 10 referred to as "sumps". FIG. 2 illustrates a portion of one sump of the engine 10. A bearing apparatus 28 is disposed in the sump. The outer shaft 26 is surrounded by a stationary structural frame 30 (FIG. 1) having an annular flange 32 which extends radially inward. An annular bearing support 34 having opposed inner and outer surfaces 36, 38 respectively, extends axially aft from the flange 32. A rolling-element bearing 40 is disposed between the bearing support 34 and the outer shaft 26. The bearing apparatus 28 is merely an example, and the principles described herein may be applied to any bearing-shaft support arrangement.

A bearing mount 42 is mounted to the flange 32. The bearing mount 42 is an annular structure comprising an inner ring 44, an outer ring 46, and an end wall 48. The inner ring 44 has opposed inner and outer faces 50, 52, respectively. Collectively, when viewed in half-section, the inner ring 44, outer ring 46, and the end wall 48 form a narrow "U" shape. The bearing mount 42 surrounds the bearing support 34, such that the inner ring 44 is disposed radially inboard of the bearing support 34, and the outer ring 46 is disposed radially outboard of the bearing support 34. A portion of the outer ring 46 extends in the radial direction so as to define a mounting flange 54. The outer ring 46 includes a plurality of mounting holes 56 which receive fasteners 58 which secure the outer ring 46 to the flange 32.

The bearing mount 42 is configured to be essentially rigid against axial deflection of the inner ring 44 while permitting controlled radial deflection of the inner ring 44. The bearing mount 42 can thus be considered a spring support or a resilient support. The configuration of the bearing mount 42 may be modified to suit a particular application, in particular to achieve a desired radial stiffness. The resilient support need not be U-shaped or include both inner and outer rings; a single ring equivalent to the inner ring 44 may be provided and supported in other configurations of members, such as "L" or "T" shapes, for example. As used herein the term "stiffness" refers to the force or unit load required per unit deflection. As an example, the outer ring 46 may be configured as an array of axially-extending spring arms 60 with spaces therebetween.

As will be described in more detail below, the bearing mount 42 and the bearing support 34 are configured to drain oil away from the bearing 40. In the illustrated example, the inner ring 44 includes one or more inner transfer passages 62 extending radially therethrough, and the bearing support 34 includes one or more transfer passages 64. The one or more outer transfer passages 64 are in fluid communication with the one or more inner transfer passages 62.

The outer face 52 of the inner ring 44 and the inner surface 36 of the bearing support 34 have a small radial clearance therebetween and cooperatively define a thin annular squeeze film space. The squeeze film space is effectively divided into forward and aft squeeze film spaces 66, 68, respectively, by the inner and outer transfer passages 62, 64. During engine operation, damper fluid such as an oil under pressure, is introduced into the squeeze film spaces 66, 68. In accordance with known principles, any rotor imbalance may cause the outer shaft 26 and the bearing 40 to undergo radial motion and subject oil in the squeeze film spaces 66, 68 to very high pressure, thereby forcing viscous flow of the oil and a damping action on the bearing 40 and outer shaft 26. This action limits deflection of the inner ring 44 and the bearing 40.

The forward squeeze film space 66 is connected to an annular forward oil manifold 72 by one or more transfer holes 74. In order to seal damper oil in the forward squeeze film space 66, the bearing support 34 includes a pair of spaced-apart seal grooves 76 in its inner surface 36. A pair of sealing rings 78 are fitted in the seal grooves 76 forward and aft of the transfer holes 74, and adapted to engage the outer face 52 of the inner ring 44, thereby sealing forward and aft boundaries of the forward squeeze film space 66. Other functionally equivalent seals may be substituted for the seal grooves 76 and sealing rings 78.

The aft squeeze film space 68 is connected to an annular aft oil manifold 82 by one or more transfer holes 84. In order to seal damper oil in the aft squeeze film space 68, the bearing support 34 includes a pair of spaced-apart seal grooves 76 in its inner surface 36. A pair of sealing rings 78 are fitted in the seal grooves 76 forward and aft of the transfer holes 84 and adapted to engage the outer face 52 of the inner ring 44, thereby sealing forward and aft boundaries of the aft squeeze film space 68.

An oil feed gallery 86 extends axially through the bearing support 34 and communicates with the forward and aft oil manifolds 72, 82. The oil manifolds 72, 82 could be fed with oil independently or using a single gallery.

In the illustrated example the bearing 40 is a ball bearing which includes an annular inner race 88, a row of spherical balls 90, an annular outer race 92, and a cage or retainer 94. The inner race 88 is secured to the outer shaft 26 so that it will not rotate relative thereto, and the outer race 92 is secured to the inner ring 44 so that it will not rotate relative thereto. The bearing 40 is configured as described above such that axial loads (also referred to as thrust loads) can be transmitted from the outer shaft 26 through the bearing 40 and the bearing mount 42 to the frame 30.

One or more oil supply passages 96 extend through the inner race 88. In operation, pressurized oil may be supplied to the balls 90 through the oil supply passages 96 in a known manner. One or more drain passages 98 extend through the outer race 92. The purpose of the drain passages 98 is to permit oil to exit the bearing 40, carrying away heat with it.

The one or more drain passages 98 are in fluid communication with the inner transfer passage 62 described above. Collectively, the drain passages 98, the inner transfer passages 62, and the outer transfer passages 64 define a drain path for oil to exit and be carried away by a conventional drain and scavenge system (not shown) of the engine 10.

In operation, oil enters the squeeze film spaces 66, 68 through the forward and aft transfer holes 74, 84 respectively. As part of the damping function, some oil inherently leaks past the sealing rings 78 to be carried away by the drain and scavenge system. The oil flow path of the drained outer race 92 is functionally separated from the oil flow path for the squeeze film spaces 66, 68 such that the drain flow does not interfere with the oil within the squeeze film spaces 66, 68. More specifically, the separation of the squeeze film damper into two portions provides a physical volume for the drain path described above.

Figure 3:
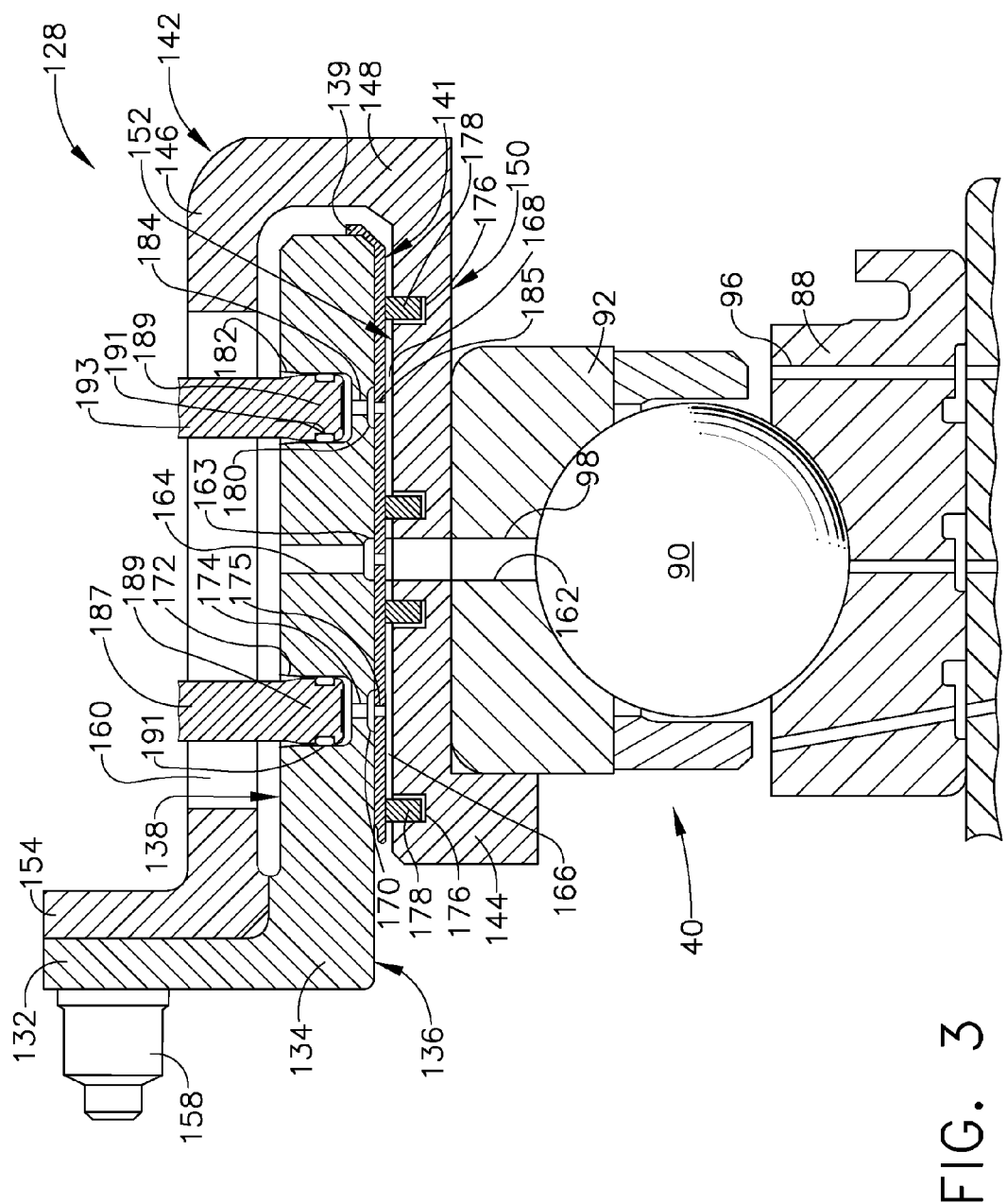
FIG. 3 is a schematic cross-sectional view of an alternative bearing apparatus.

FIG. 3 illustrates an alternative bearing apparatus 128 for mounting the bearing 40, similar in construction to the apparatus 28 described above. Elements of the bearing apparatus 28 not specifically described may be considered to be identical to the apparatus 128 shown in FIG. 2. The apparatus 128 includes an annular flange 132 extending radially inward from a stationary frame (not shown). An annular bearing support 134 having opposed inner and outer surfaces 136, 138 extends axially aft from the flange 132. In the illustrated example, an annular liner 139 is mounted adjacent the inner surface 136, and includes an inner surface 141. A rolling-element bearing 40 is disposed between the bearing support 134 and the outer shaft 26.

A bearing mount 142 is mounted to the flange 132. The bearing mount 142 is an annular structure comprising an inner ring 144, an outer ring 146, and an end wall 148. The inner ring 144 has opposed inner and outer faces 150, 152 respectively. Collectively, when viewed in half-section, the inner ring 144, outer ring 146, and the end wall 148 form a narrow "U" shape. The bearing mount 142 surrounds the bearing support 134, such that the inner ring 144 is disposed radially inboard of the bearing support 134, and the outer ring 146 is disposed radially outboard of the bearing support 134. A portion of the outer ring 146 extends in the radial direction so as to define a mounting flange 154. Fasteners 158 secure the outer ring 146 to the flange 132.

The bearing mount 142 is configured to be essentially rigid against axial deflection of the inner ring 144 while permitting controlled radial deflection of the inner ring 144, as described above. The outer ring 146 may be configured as an array of axially-extending spring arms 160 with spaces therebetween. The bearing mount 142 need not be U-shaped or include both inner and outer rings; a single ring equivalent to the inner ring 44 may be provided and supported in other configurations of members, such as "L" or "T" shapes, for example.

The bearing mount 142 and the bearing support 134 are configured to drain oil away from the bearing 40. In the illustrated example, the inner ring 144 includes one or more inner transfer passages 162 extending radially therethrough, the liner 139 includes one or more intermediate transfer passages 163 communicating with the one or more inner transfer passages 162, and the bearing support 134 includes one or more outer transfer passages 164 communicating with the one or more inner transfer passages 162 and the one or more intermediate transfer passages 163.

The outer face 152 of the inner ring 144 and the inner surface 141 of the liner 139 have a small radial clearance therebetween and cooperatively define a thin annular squeeze film space. The squeeze film space is effectively divided into forward and aft squeeze film spaces 166, 168 respectively, by the sealing rings 178 described below. During engine operation, the squeeze film spaces 166, 168 provide a damping function as described above.

The forward squeeze film space 166 includes an annular forward channel 170 communicating with the inner surface 136 of the bearing support 134. The forward channel 170 communicates with one or more forward ports 172 through one or more transfer holes 174. One or more forward feed passages 175 extend through the liner 139 and communicate with the forward channel 170. In order to seal damper oil in the forward squeeze film space 166, the inner ring 144 of the bearing mount 142 includes a pair of spaced-apart seal grooves 176 in its outer face 152. A pair of sealing rings 178 are fitted in the seal grooves 176 forward and aft of the forward channel 170, and adapted to engage the inner surface 141 of the liner 139, thereby sealing forward and aft boundaries of the forward squeeze film space 166. Other functionally equivalent seals may be substituted for the seal grooves 176 and sealing rings 178.

The aft squeeze film space 168 includes an annular aft channel 180 communicating with the inner surface 136 of the bearing support 134. The aft channel 180 is connected to one or more aft ports 182 by one or more transfer holes 184. One or more aft feed passages 185 extend through the liner 139 and communicate with the aft channel 180. In order to seal damper oil in the aft squeeze film space 168, the inner ring 144 of the bearing mount 142 includes a pair of spaced-apart seal grooves 176 in its outer face 152. A pair of sealing rings 178 are fitted in the seal grooves 176 forward and aft of the aft channel 180, and adapted to engage the inner surface 141 of the liner 139, thereby sealing forward and aft boundaries of the aft squeeze film space 168.

A forward oil feed tube 187 extends radially through the bearing support 134 and has a distal end 189 engaged in the forward port 172 and provided with a seal 191. An aft oil feed tube 193 extends radially through the bearing support 134 and has a distal end 189 engaged in the aft port 182 and provided with a seal 191. The function of the bearing apparatus 128 is substantially the same as the bearing apparatus 28 described above, except for the oil supply configuration utilizing oil feed tubes in place of the oil feed gallery.

Both of the examples described above have been configured with a shaft mounted in the bearing's inner rare and the outer race mounted to a stationary structure. It is conceivable that the combination of a drained bearing race and a squeeze film damper could be used in other configurations. For example, the damper could be connected to the inner race, and the inner race could be drained. Furthermore, the bearing could be an inter-shaft bearing, mounted between two rotating shafts rather than a shaft and a stationary structure.

The apparatus described above has the technical effect of permitting a rolling-element bearing with both a drained outer race and a squeeze film damper within the same volume as a conventional damped but undrained bearing.

The foregoing has described a bearing apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A bearing apparatus, comprising:
    a bearing including a first race rotatable relative to a second race, wherein the first race includes one or more drain passages extending therethrough; and
    a squeeze film damper connected to the first race, the squeeze film damper including first and second squeeze film spaces separated by an oil drain path which communicates with the one or more drain passages of the first race,
    wherein the squeeze film damper includes:
        an annular bearing support; and
        an annular bearing mount having inner and outer rings positioned radially inboard and outboard of the bearing support, respectively, wherein the first race is an outer race of the bearing and is received in the inner ring of the bearing mount.

2. The apparatus of claim 1 wherein the inner and outer rings are connected by an end wall, collectively forming a U-shape.

3. The apparatus of claim 1 wherein the squeeze film spaces are defined between the bearing support and the inner ring of the bearing mount.

4. The apparatus of claim 1 wherein the bearing mount includes a radially-extending mounting flange clamped to a flange of the bearing support by one or more fasteners.

5. The apparatus of claim 1 wherein the bearing support includes annular first and second oil manifolds communicating with the first and second squeeze film spaces.

6. The apparatus of claim 5 wherein the bearing support includes an oil feed gallery extending axially therethrough and communicating with the first and second oil manifolds.

7. The apparatus of claim 1 further comprising first and second oil feed tubes extending radially through the bearing mount and communicating with the first and second sneeze film spaces, respectively.

8. The apparatus of claim 7 wherein each oil feed tube is received in a port formed in the bearing support.

9. The apparatus of claim 8 wherein each port communicates with one of the squeeze film spaces.

10. The apparatus of claim 1 wherein the bearing support and the bearing mount each include one or more transfer passages disposed in fluid communication with the one or more drain passages of the first race.

11. A bearing apparatus, comprising:
- a bearing including a first race rotatable relative to a second race, wherein the first race includes one or more drain passages extending therethrough; and
- a squeeze film damper connected to the first race, the squeeze damper including first and second squeeze film spaces separated by an oil drain path which communicates with the one or more drain passages of the first race, wherein the squeeze film damper includes:
- an annular bearing support; and
- bearing mount having a ring positioned radially adjacent to the bearing support, wherein the first race is received in the ring of the bearing mount, and wherein the first and second squeeze film spaces are defined between the bearing support and the bearing mount.

* * * * *